Figure 1:
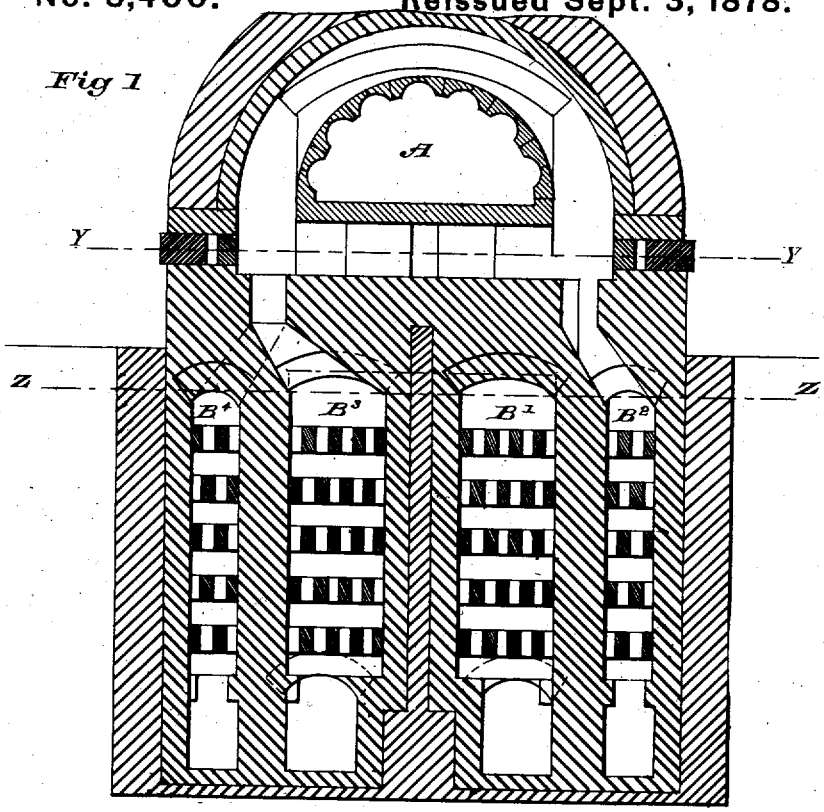

4 Sheets—Sheet 1.

F. SIEMENS

Hardening, Tempering and Pressing Glass.

No. 8,400. Reissued Sept. 3, 1878.

Witnesses:
R. K. Walker
W. A. Redmond

Inventor:
Friedrich Siemens by
C. S. Whitman.
attorney

4 Sheets—Sheet 2.

F. SIEMENS.

Hardening, Tempering and Pressing Glass.

No. 8,400. Reissued Sept. 3, 1878.

*Witnesses:*
B. K. Walker
W. A. Redmond

*Inventor:*
F. Siemens by
C. Wittemann
Attorney

F. SIEMENS.

Hardening, Tempering and Pressing Glass.

No. 8,400. Reissued Sept. 3, 1878.

*Witnesses:*
B. R. Walker
W. A. Redmond

*Inventor*
F. Siemens
C. S. Whitman
attorney

F. SIEMENS.

Hardening, Tempering and Pressing Glass.

No. 8,400. Reissued Sept. 3, 1878.

Witnesses:
B. K. Walker
W. A. Redmond

Inventor
F. Siemens by
C. S. Whitman
attorney

UNITED STATES PATENT OFFICE.

FREDERICK SIEMENS, OF DRESDEN, GERMAN EMPIRE.

IMPROVEMENT IN HARDENING, TEMPERING, AND PRESSING GLASS.

Specification forming part of Letters Patent No. 192,537, dated June 26, 1877; Reissue No. 8,400, dated September 3, 1878; application filed June 13, 1878; patented in England, December 3, 1875.

DIVISION B.

*To all whom it may concern:*

Be it known that I, FREDERICK SIEMENS, of Dresden, in the German Empire, have invented a new Process in the Manufacture of Glass, whereby its power of resisting fracture on impact and on account of sudden changes of temperature is greatly enhanced, of which the following is a specification:

In order that my invention may be clearly distinguished from processes heretofore known, I will refer to the state of the art to which my invention relates.

When glass is melted and shaped into articles which are allowed to cool in the air, it becomes too brittle for any practical use, as the exterior cools first and forms a contracted crust, which shelters the interior particles. If, however, the glass is placed in a hot oven and allowed to cool slowly, the particles appear to assume a condition of more perfect equilibrium of cohesive force, so that the glass becomes more elastic. The process of annealing, therefore, has long been known as a very essential operation.

It has been alleged that window-glass of uniform thickness may be manufactured by pressing the melted glass between two parallel and polished plates of cast-iron or steel until the desired thickness is obtained, or by pouring the melted glass between two parallel and polished plates and submitting it to pressure from without; but it is not claimed that these processes change in any way the physical properties of the glass or render it less frangible.

It has heretofore been alleged that glass may be hardened by placing it in platinum molds, fusing or nearly fusing it, and then suddenly depriving it of its caloric by frigorific mixtures; but it is not claimed that this treatment imparts to the glass abnormal powers of resisting a disruptive force.

It has heretofore been alleged that glass may be rendered less fragile by immersing it while in a highly-heated state in a bath of oils, grease, wax, resinous or bituminous substances, the boiling-temperature of which is above the boiling-temperature of water; but articles treated by this process must be finished before the treatment for lessening the frangibility of the glass can be proceeded with. Objections have also been urged against the glass which has been subjected to this process, that although it may possess enhanced powers of resisting the initial effort of a disruptive force, still, when a slight fracture takes place, its molecular organization goes to ruin and it becomes almost entirely disintegrated.

The object of my invention is to impart to glass the power of resisting fracture on impact or fracture caused by variations of temperature without impairing any of its known valuable qualities or economic uses; and to that end my invention consists in subjecting heated glass to pressure in or between molds, as hereinafter described.

It is to be noted that my invention differs entirely from those processes which have not for their object the rendering of glass less frangible, and bears no analogy to methods of toughening glass which require the article to be finished before the treatment for rendering it less frangible is proceeded with.

When the articles are such as are usually molded, I effect the strengthening thereof at the same time with their pressing, so as to produce a tough-pressed glass by the use of molds of metal or other similar material, in which the glass articles, after having been completely shaped and while they are in a highly-heated condition, are squeezed, the molds having the effect of giving the necessary cooling, without having recourse to a liquid bath.

The material employed for such molds will depend upon the nature and thickness of the glass to be operated upon. In cases where the cooling has to be effected separately, metals of good conducting-power—such as copper—are to be preferred, and in cases where the cooling has to be effected more gradually, molds of earthenware or other materials that are bad conductors of heat may be used.

Again, in cases where the glass articles operated upon vary in thickness, the conductivity of the different parts of the mold is varied accordingly, either by making thicker those parts of the mold which come next to the thickest parts of the glass, so as to absorb a greater amount of heat, or by making those parts of a better conducting material than the parts next to the thin portions of the glass. The molds will also have to be maintained at a certain temperature, varying according as the nature of the glass to be operated upon requires that they should be cooled to a greater or less degree. It will generally be found sufficient to employ cast-iron molds, that are maintained at the temperature of boiling or warm water, and earthenware molds, that are kept quite cool.

The glass articles, after having been wholly shaped, are placed in a heating-oven, in order to be raised to the requisite degree of heat for being subjected to the above-described pressing and cooling process; and as many glass articles, when subjected for a length of time to a high temperature—such as would be necessary in the present case—are apt to get out of shape, I prefer in such cases to inclose them, before placing them in the heating-oven, in a casing or shell of platinum, which supports the glass and prevents it from getting out of shape while in the heating-oven, the glass article, with the platinum shell upon it, being then placed in the mold for the pressing and toughening process.

The heating-ovens employed may be of any suitable known construction; but it is preferable to use ovens heated by gaseous fuel, in order to prevent the purity of the glass from being impaired. Although it is in most cases preferable to heat the glass articles in such heating-ovens before subjecting them to the pressing and cooling process, as before described, yet partially-formed glass articles may, in some cases, be conveyed direct from the glass-melting furnace on the glass-blower's pipe into the pressing and cooling molds; or the liquid glass may even be conveyed direct into the pressing and cooling molds without having been previously shaped.

Figure 4:
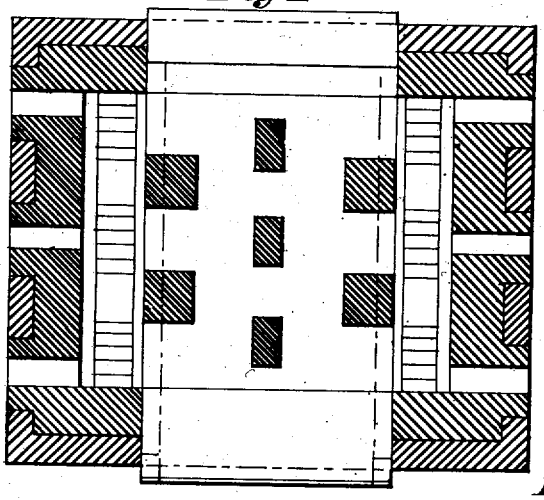
Figure 2:
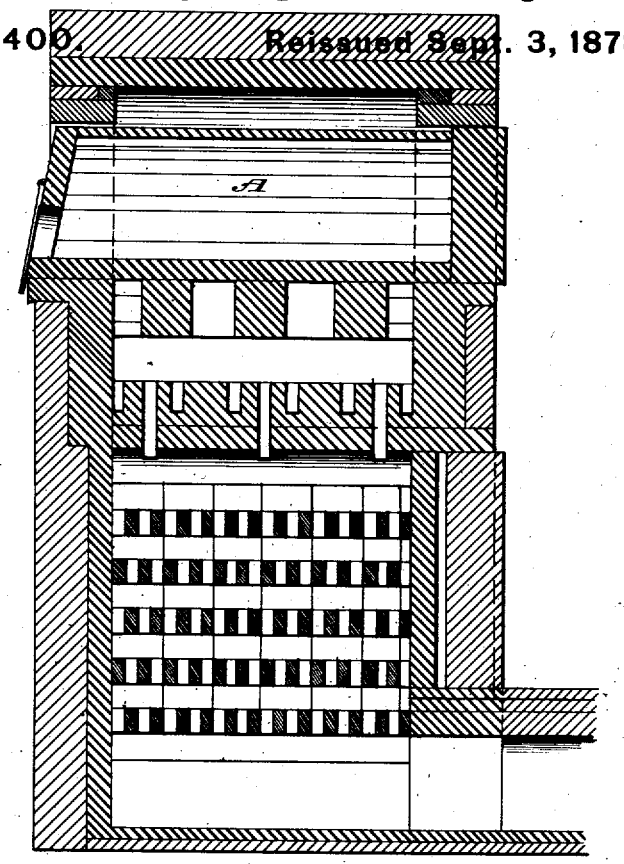
Figure 5:
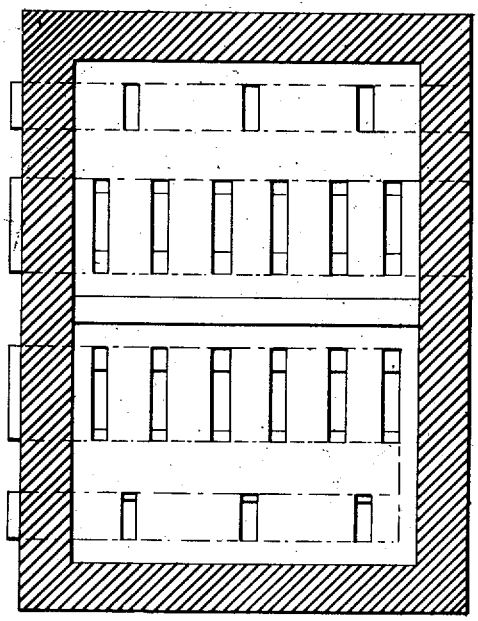
Figure 3:
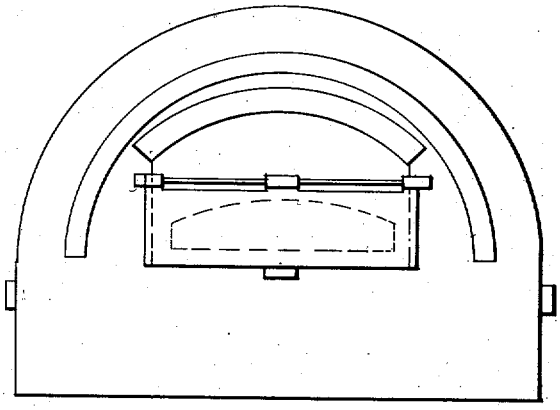

In the accompanying plates of drawings, in which corresponding parts are designated by similar letters, Figure 1 is a transverse section of a regenerative-gas muffle-oven suitable for heating the glass articles that are to be treated according to my invention. Fig. 2 is a longitudinal section of the same. Fig. 3 is a front view of the oven. Figs. 4 and 5 are sectional plans on the lines *y y z z* of Fig. 1, respectively.

The muffle A is heated, both under its floor and over its crown, by the flame of the gas and air from the one pair of regenerators, $B^1$ $B^2$, and the heated products of combustion pass off through the other pair of regenerators, $B^3$ $B^4$, till, the first pair being sufficiently cooled and the second pair sufficiently heated, the direction of the currents is reversed for alternate working in the usual manner. The muffle A being completely closed in, the glass articles heated in it are protected from dust and other impurities, such as, in an open oven, are apt to settle on the softened glass and damage its surface.

Figure 6:
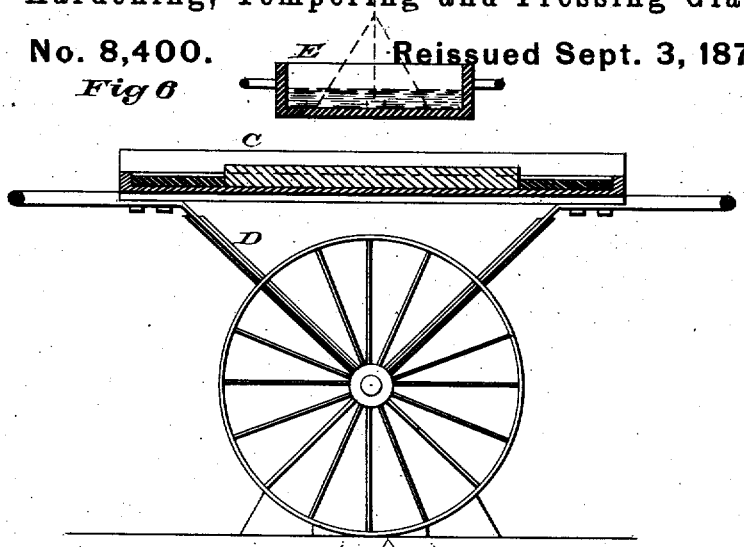
Figure 7:
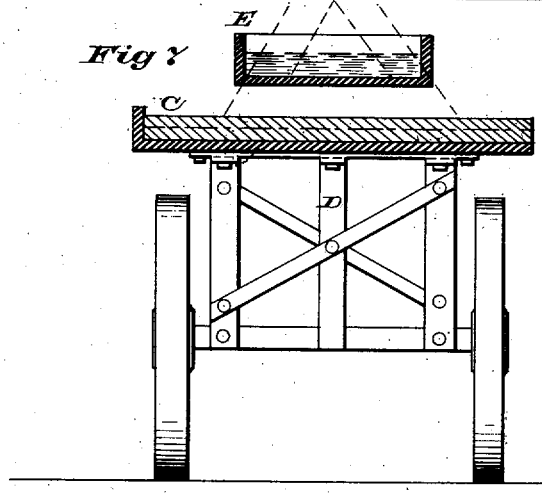
Figure 8:
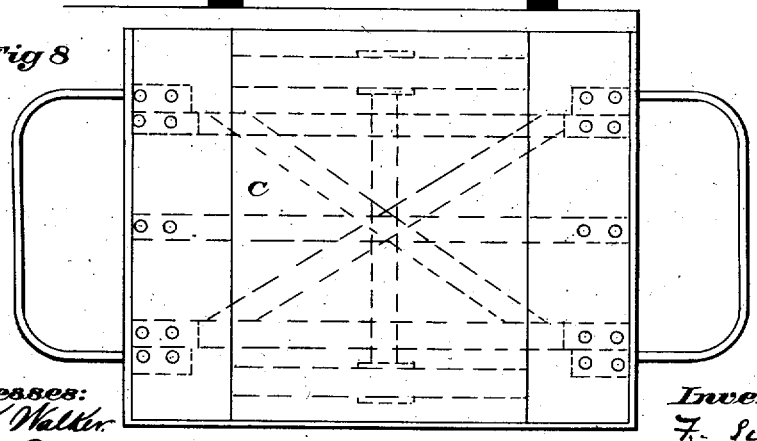

Fig. 6 is a side view, Fig. 7 an end view, and Fig. 8 a plan, of a pair of pressing-molds and carriage, such as may be conveniently employed in the process. The lower mold, C, placed on the truck D, receives the heated glass from the oven, and the truck is then run under the upper mold, E, which is let down upon it, being loaded, when necessary, to give the desired pressure.

The molds shown in Figs. 6 and 7 are suited to flat glass plates. For glass articles of other shapes the molds are made of suitable form, as shown in Fig. 9, where *c* is a hollow or concave lower mold, with a glass plate, *p*, resting on it by its edges; and *e* is a corresponding convex upper mold, which, being lowered on the glass *p*, presses it down into the lower mold, the glass being thus at the same time pressed and toughened by the cooling influence of the molds.

Figure 9:
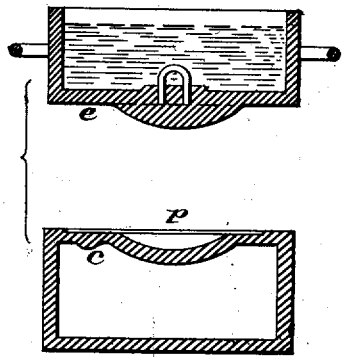

The temperature of the molds may be kept at the required point by charging them with liquid, as shown with respect to the upper molds in Figs. 6, 7, and 9. Usually water serves for this purpose, the temperature of its boiling-point being well suited for giving the required infrangibility.

Having thus described my invention, I claim—

The process, substantially as herein described, of subjecting heated glass articles to pressure in molds, whereby the glass is simultaneously compressed and rendered less frangible.

In testimony that I claim the foregoing I have hereunto set my hand and seal this 1st day of April, 1878.

FREDERICK SIEMENS. [L. S.]

Witnesses:
LÉON KLEMPERER,
PAUL DRUCKMÜLLER.